United States Patent Office 3,305,490
Patented Feb. 21, 1967

3,305,490
FLUORESCENT PHOSPHATE GLASS
Mary V. Hoffman, South Euclid, Ohio, assignor to General Electric Company, a corporation of New York
No Drawing. Filed Sept. 12, 1963, Ser. No. 308,351
3 Claims. (Cl. 252—301.6)

This invention relates generally to fluorescent materials and has for its object the provision of new fluorescent glass compositions and a method of preparation thereof.

In accordance with the invention, there are provided new fluorescent glasses composed of a phosphate of barium and magnesium and/or zinc activated with stannous tin. More particularly, I have discovered that in the area of the compatibility triangles for the $$BaO-MgO-P_2O_5$$

and the $BaO-ZnO-P_2O_5$ systems between the pyro- and metaphosphate joins there is a small region which forms stable glasses which can be activated by tin to emit a blue-white color when excited by short wave (2537 A.) ultraviolet or by cathode rays. Crystalline compositions in this region are not fluorescent with tin.

The fluorescent glasses are composed, in mol percent, of 38 to 50% $P_2O_5$, 45 to 55% MgO and/or ZnO, 2 to 10% BaO and 0.5 to 5% Sn. A preferred composition consists of 44% $P_2O_5$, 49% MgO and/or ZnO, 5% BaO and 2% Sn, in mol percent, which is midway between the pyro- and metaphosphates.

Compositions lower in $P_2O_5$ do not remain a pure glass when cooled but contain some crystalline material, for instance $MgBaP_2O_7$ and/or $Mg_2P_2O_7$. Compositions higher in $P_2O_5$ than the glasses have a higher melting point so that the composition of 45 mol percent $P_2O_5$, 50 mol percent MgO and 5 mol percent BaO is close to the eutectic composition.

In a preferred method of preparation, magnesium ammonium phosphate ($MgNH_4PO_4 \cdot H_2O$), diammonium phosphate (($NH_4$)$_2HPO_4$), barium acid phosphate $$(BaHPO_4)$$

and tin oxide (SnO or $SnO_2$) are mixed in proportions to give, in mol percent, 38 to 50% $P_2O_5$, 45 to 55% MgO and/or ZnO, 2 to 10% BaO and 0.5 to 5% Sn. The mixture is fired at about 500° C. for a short time to decompose the diammonium phosphate, preferably remixed with at least 1% by weight, for example preferably 5%, of ammonium chloride, and then melted at about 1000° C. to 1250° C. in a suitable crucible, for example of kyanite or zircon. The resulting glass is cooled, for example, by pouring it into water or onto a plate, and then milled.

It will be evident that other starting or batch materials may be used. For example, in place of magnesium ammonium phosphate one may use basic magnesium carbonate or magnesium oxide. In place of ammonium phosphate, one may use phosphoric acid; barium acid phosphate or magnesium ammonium phosphate may also be used, in which case an additional source of phosphate, such as phosphoric acid, is needed. In place of barium acid phosphate one may use barium carbonate or barium hydroxide. Sources of zinc include zinc oxide, zinc ammonium phosphate and zinc orthophosphate. Other chlorides than ammonium chloride include the chlorides of barium, strontium, calcium, zinc or magnesium.

The ammonium chloride, or other chloride, is necessary for good brightness. About 0.1% by weight of chlorine is retained in the final composition. Samples melted without ammonium chloride had the same emission but were only about 30% as bright as those containing chloride. The glass was melted in air with no reducing atmosphere other than that supplied by the decomposition of the ammonium chloride, and almost 90% of the retained tin was in the stannous state. The addition of a mixture of hydrogen and nitrogen over the melt did not improve the brightness or change the spectral distribution. Referring the glass in air or in a reducing atmosphere below the melting point resulted in recrystallization and loss of most of the brightness.

The glasses respond to 2537 A. excitation and to cathode rays. The emission is a broad spectra; the magnesium glass (i.e., no zinc) peaks at about 4300 A. under 2537 A. excitation. The presence of zinc in the composition shifts the color toward longer wave lengths, and the zinc glass (i.e., no magnesium) peaks at about 4500 A.

By way of a specific example of preparation of a magnesium glass, 77.5 grams of $MgNH_4PO_4 \cdot H_2O$, 11.85 grams $BaHPO_4$, 46.3 grams $(NH_4)_2HPO_4$ and 2.6 grams SnO are milled and then fired at about 500° C. for one hour in a Vycor crucible. The resulting mixture is milled with 5 weight percent $NH_4Cl$ and then melted at 1250° C., requiring 5 to 10 minutes, in a kyanite or zircon crucible, then poured into water or onto a plate to cool, and then milled.

A zinc glass may be similarly prepared by mixing together 44.7 grams $ZnNH_4PO_4$, 8.3 grams $BaHPO_4$, 19.1 grams $(NH_4)_2HPO_4$ and 1.5 grams SnO, firing at about 500° C. for one hour, mixing with 5 weight percent $NH_4Cl$, melting at 1000° C. or higher, pouring into water, and milling.

Mixed magnesium and zinc glasses are similarly prepared by substituting one for the other in whole or in part.

What I claim as new and desire to secure by Letters Patent of the United States is:

1. A fluorescent glass having a composition consisting essentially of a material of the class consisting of MgO and ZnO and mixtures thereof in an amount of about 45 to 55 mol percent, about 2 to 10 mol percent BaO, about 38 to 50 mol percent $P_2O_5$, about 0.1% chlorine by weight of the composition, and about 0.5 to 5 mol percent stannous tin activator.

2. A fluorescent glass having a composition consisting essentially of a material of the class consisting of MgO and ZnO and mixtures thereof in an amount of about 49 mol percent, about 5 mol percent BaO, about 44 mol percent $P_2O_5$, about 0.1% chlorine by weight of the composition, and about 0.5 to 5 mol percent stannous tin activator.

3. The method of preparing a fluorescent glass which comprises mixing together a material of the class consisting of magnesium ammonium phosphate and zinc ammonium phosphate and mixtures thereof, barium acid phosphate, diammonium phosphate and tin oxide in proportions to yield material of the class consisting of MgO and ZnO and mixtures thereof in an amount of about 45 to 55 mol percent, about 2 to 10 mol percent BaO, about 38 to 50 mol percent $P_2O_5$, and about 0.5 to 5 mol percent tin, firing the mixture at about 500° C. for a time sufficient to decompose the diammonium phosphate, mixing the fired mixture with about 1 to 5 weight percent of ammonium chloride, and heating the mixture at a temperature and for a time sufficient to melt it.

References Cited by the Examiner

UNITED STATES PATENTS

| | | | |
|---|---|---|---|
| 2,031,958 | 2/1936 | Kaufmann et al. | 106—47 |
| 2,042,425 | 5/1936 | Kaufmann et al. | 252—301.4 |
| 2,270,124 | 1/1942 | Huniger et al. | 252—301.4 |
| 2,730,504 | 1/1956 | McKeag | 252—301.4 |
| 3,198,742 | 8/1965 | Ropp | 252—301.4 |

HELEN M. McCARTHY, *Acting Primary Examiner.*

TOBIAS E. LEVOW, *Examiner.*

R. D. EDMONDS, *Assistant Examiner.*